(12) United States Patent
Zorzetto et al.

(10) Patent No.: US 8,408,067 B2
(45) Date of Patent: Apr. 2, 2013

(54) PRESSURE SENSOR DEVICE

(75) Inventors: Mauro Zorzetto, Casale Monferrato (IT); Giorgio Martinengo, Casale Monferrato (IT)

(73) Assignee: ELTEK S.p.A., Casale Monferrato (Alessandria) (IT)

( * ) Notice: Subject to any disclaimer, the term of this patent is extended or adjusted under 35 U.S.C. 154(b) by 185 days.

(21) Appl. No.: 13/057,118

(22) PCT Filed: Jul. 30, 2009

(86) PCT No.: PCT/IB2009/053323
§ 371 (c)(1),
(2), (4) Date: Mar. 28, 2011

(87) PCT Pub. No.: WO2010/013216
PCT Pub. Date: Feb. 4, 2010

(65) Prior Publication Data
US 2011/0174080 A1    Jul. 21, 2011

(30) Foreign Application Priority Data

Aug. 1, 2008 (IT) .............................. TO2008A0610

(51) Int. Cl.
*G01L 7/00* (2006.01)
(52) U.S. Cl. ........................................................ 73/756
(58) Field of Classification Search .................. None
See application file for complete search history.

(56) References Cited

U.S. PATENT DOCUMENTS

| 4,168,630 | A | * | 9/1979 | Shirouzu et al. | ................. 73/727 |
| 5,186,055 | A | * | 2/1993 | Kovacich et al. | ................ 73/727 |
| 5,792,958 | A | * | 8/1998 | Speldrich | ........................ 73/727 |
| 8,051,719 | B2 | * | 11/2011 | Bigliati et al. | .................. 73/756 |

FOREIGN PATENT DOCUMENTS

| WO | 98/31997 | 7/1998 |
| WO | 2008/078184 | 7/2008 |

OTHER PUBLICATIONS

International Search Report for PCT/IB2009/053323, mailed Sep. 29, 2009.
Written Opinion of the International Searching Authority for PCT/IB2009/053323, mailed Sep. 29, 2009.

* cited by examiner

*Primary Examiner* — Andre Allen
(74) *Attorney, Agent, or Firm* — Nixon & Vanderhye P.C.

(57) ABSTRACT

A pressure sensor device (1) comprises: a pressure sensor (9) having a sensor body (9*a*) defined in which is a cavity (11) with a bottom surface (11*a*) belonging to a membrane portion (9') of the body itself, a detection element operatively being associated to the membrane portion (9'), a connection structure (2) having a duct (2*a*, 15, 19) in communication with the abovementioned cavity (11), designed to receive a fluid a pressure of which is to be detected. The connection structure comprises a body (2) for supporting the pressure sensor (9), defining at least one respective passage (2*a*), and one compressible element (12) designed to be in contact with the fluid and configured to compensate possible volume variations thereof, the compressible element (12) being positioned at least partially within the cavity (11), in such a manner to substantially divide it into two opposite regions. The device (1) is provided with connection passages (12*f*) for maintaining different regions of the cavity (11) in fluid communication, i.e. equilibrate in pressure.

9 Claims, 5 Drawing Sheets

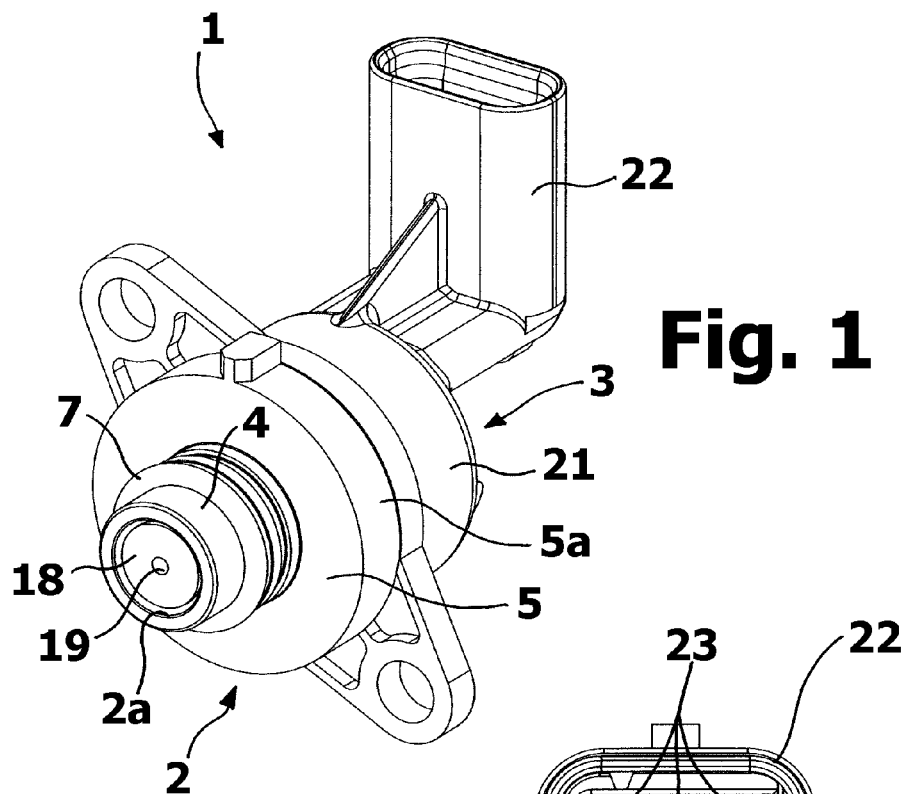
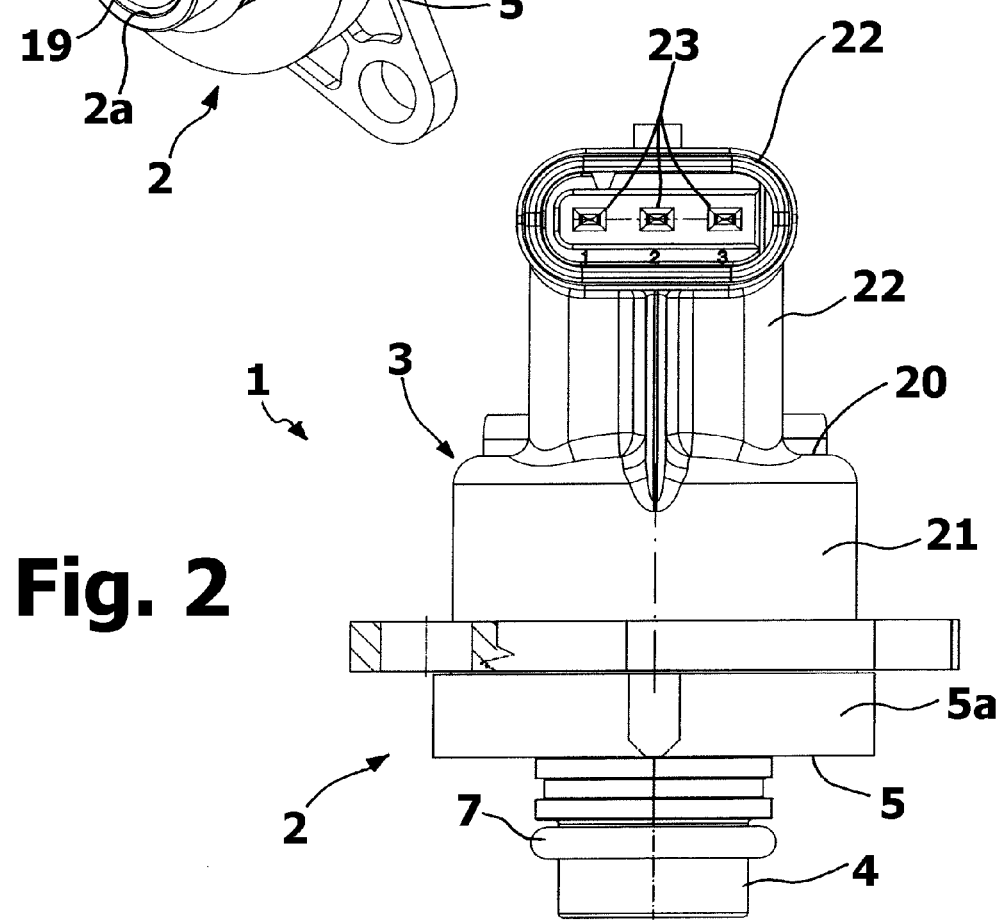

PRESSURE SENSOR DEVICE

This application is the U.S. national phase of International Application No. PCT/IB2009/053323, filed 30 Jul. 2009, which designated the U.S. and claims priority to Italien Application No. TO2008A000610, filed 1 Aug. 2008, the entire contents of each of which are hereby incorporated by reference.

FIELD OF THE INVENTION

The present invention refers to a pressure sensor device having the characteristics described in the preamble of claim 1. Such sensor device is known from document WO 2008/078184.

PRIOR ART

Devices of the indicated type comprise a casing into which a pressure sensor is mounted. The sensor has a body defining a cavity, whose bottom is formed by a membrane portion of the body itself, provided on which is a detection element. The fluid subjected to measurement is supplied to the abovementioned cavity, through a duct of the casing, in such a manner to cause a flexure of the membrane portion. The degree of such flexure, which depends on the pressure of the fluid, is measured by means of the detection element, whose output signal thus represents the pressure value. The sensor body is usually made of ceramic material and the detection element provided for on the membrane portion thereof is usually of the resistive or piezoresistive type.

In some types of applications part of the fluid subjected to pressure measurement may accumulate in contact with, or inside, delicate components of the device, and specifically of the pressure sensor. In case of low ambient temperature the accumulated fluid may freeze, with the ensuing increase of volume which causes mechanical stress of the abovementioned delicate components, such as for example the membrane portion of the body of the sensor, with the risk of causing breakage or damage thereof. For such reason, WO 2008/078184 proposes positioning a compressible element, adapted to compensate possible volume variations of the fluid, directly in the cavity of the sensor body or in the immediate vicinity thereof.

SUMMARY OF THE INVENTION

An object of the present invention is that of improving the reliability and operating accuracy of a sensor of the indicated type, in a simple and inexpensive manner. Such object is attained, according to the present invention, by a pressure sensor device having the characteristics of the attached claims, which form an integral part of the technical teaching provided herein in relation to the invention.

BRIEF DESCRIPTION OF THE DRAWINGS

Further objects, characteristics and advantages of the present invention shall be clear from the detailed description that follows and from the attached drawings, strictly provided for exemplifying and non-limiting purposes, wherein:

FIG. 1 is a perspective view of a pressure sensor device according to the invention;

FIG. 2 is an elevational view of the device of FIG. 1;

DESCRIPTION OF PREFERRED EMBODIMENTS OF THE INVENTION

The structure and general functionalities of the pressure sensor device according to the invention are similar to those of the devices illustrated and described in WO2008/078184; for such reason, hereinafter, the description of the components of the device according to the invention shall be relatively schematic, taking for granted that the practical details and preferred implementation characteristics of such components can be borrowed from the mentioned prior art document.

Figure 3:
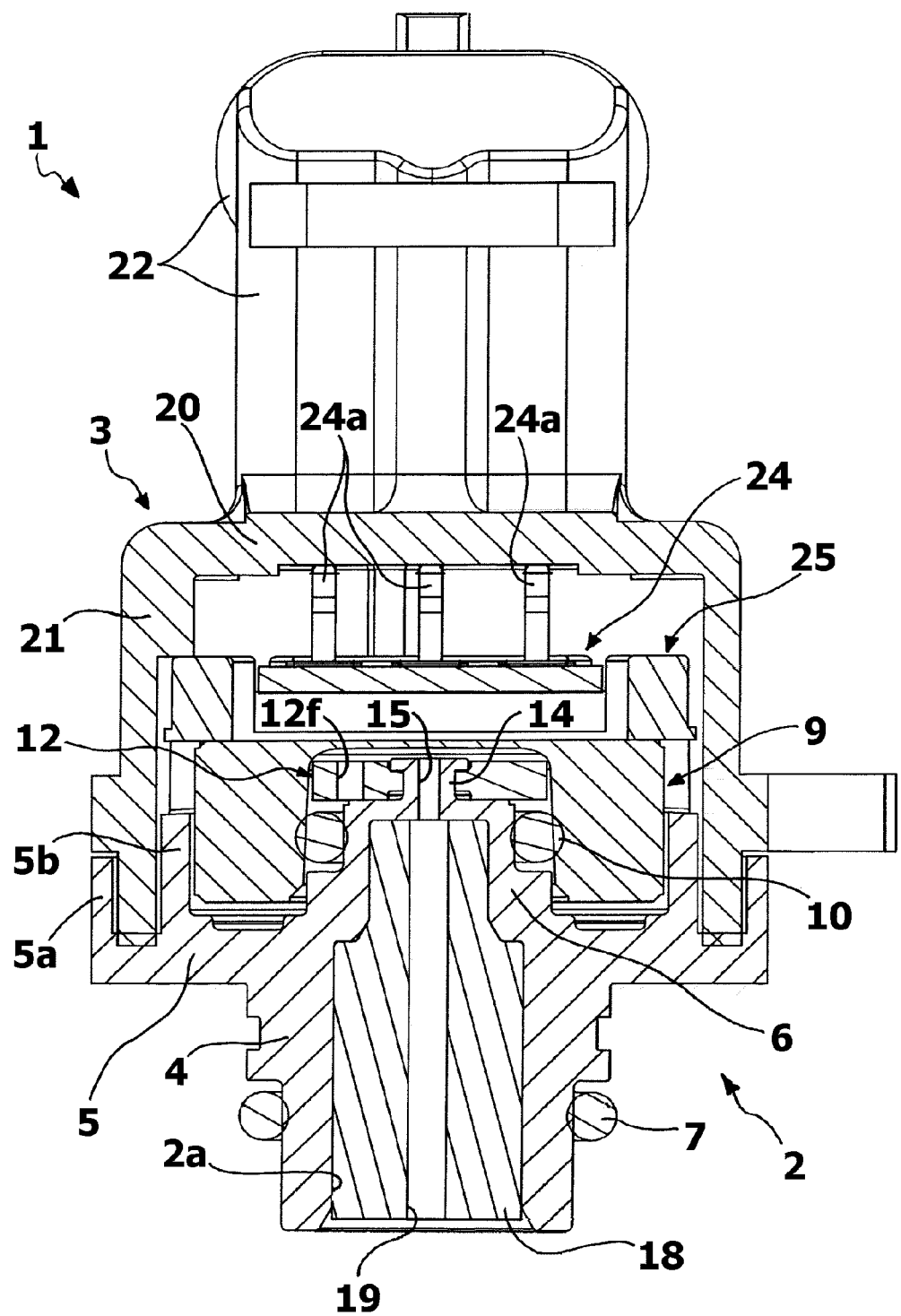
FIG. 3 is a partial sectional view of the device of FIGS. 1 and 2.

With reference to FIGS. 1-3, indicated in its entirety with 1 is a pressure sensor device according to the invention, whose structure comprises a part 2, which essentially performs support and hydraulic connection functions, and a part 3, which essentially performs cover and electrical connection or connector functions. The main body of the part 2, preferably made of relatively rigid material, such as for example thermoplastic material or metal material, is axially passed through by a cavity or passage indicated in its entirety with 2a in FIG. 3. As observable particularly in FIG. 3, identified in the body part 2 are a connection portion 4, an intermediate coupling portion 5 and an end portion 6. The connection portion 4, generally cylindrical, externally has a seat for a radial seal means 7, such as an o-ring gasket. Such portion 4, which provides an inlet port of the device 1, is intended to be connected to a hydraulic circuit, not represented, which contains the fluid whose pressure is to be detected. The intermediate portion 5 comprises a flange wall, which is extended radially outwards from the top of the connection portion 4. Rising from the abovementioned flange wall are an outer wall 5a and an inner wall 5b, having an annular configuration and substantially coaxial to each other. The wall 5b, higher than wall 5a, delimits a seat in which a pressure sensor, indicated in its entirety with 9, is positioned.

Figure 4:
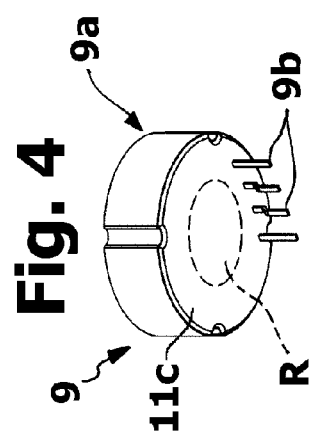
FIGS. 4 and 5 are schematic perspective views, from different angles, of the pressure sensor of the device of FIGS. 1-3.
Figure 5:
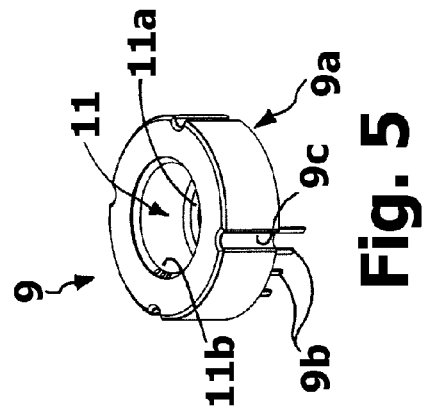

As observable in FIGS. 4 and 5, the sensor 9 has a sensor body 9a, preferably monolithic, made for example of ceramic material, or plastic material, or alumina, preferably cylindrical-shaped. Defined in the sensor body 9a is a blind axial cavity 11, open on a first end face of the body itself, such cavity being delimited by a bottom surface and a peripheral or circumferential surface, respectively indicated with 11a and 11b only in FIG. 5. Defined between the bottom surface 11a of the cavity 11 and at least part of the second end face of the sensor body 9a, indicated with 11c only in FIG. 4, is a membrane portion, indicated in FIG. 6 with reference 9', integrated in which is a detection element, represented only schematically in FIG. 4, where it is indicated with R. Preferably, the detection element R is obtained or fixed onto the second face 11c, i.e. on the side of the membrane 9' external to the cavity 11. The detection element R may be represented by a resistive or piezo-resistive element preferably thin (film) or, more generally, by any electrical or electronic component, even a semiconductor, capable of generating a signal representing a deformation or flexure of the membrane portion 9', i.e. of the fluid pressure. Projecting or rising from the second end face 11c of the sensor body 9a are terminals 9b, for the electrical connection of the sensor 9 and/or the corresponding electronic control circuit.

Still with reference to FIG. 3, rising from the central region of the flange wall 5, in position substantially coaxial with respect to the walls 5a and 5b and the connection portion 4, is the end portion 6, generally tubular cylindrical-shaped, on which a shoulder or seat for positioning a seal means 10, preferably represented by an o-ring gasket, is formed externally thereof. Such gasket 10 is intended to sealingly operate between the outer surface of the end portion 6 and the peripheral surface (11b, FIG. 5) of the cavity 11 of the sensor body 9a, as schematically shown for example in FIG. 6.

The end portion 6 projects inside the cavity 11 of the sensor body 9a and mounted on its upper part is a compensation element, indicated with 12. The element 12 is made of compressible material, in such a manner to be able to compensate possible volume increases of the fluid subjected to detection, for example in case of freezing. In the currently preferred embodiment, the body of the compensation element 12 is made of spongy or foamed material, preferably of the closed cells impermeable type, such as for example EPDM or silicone. The body of the element 12 may however be made in another manner, for example using elastic material provided with an inner compressible chamber or portion.

Figure 6:
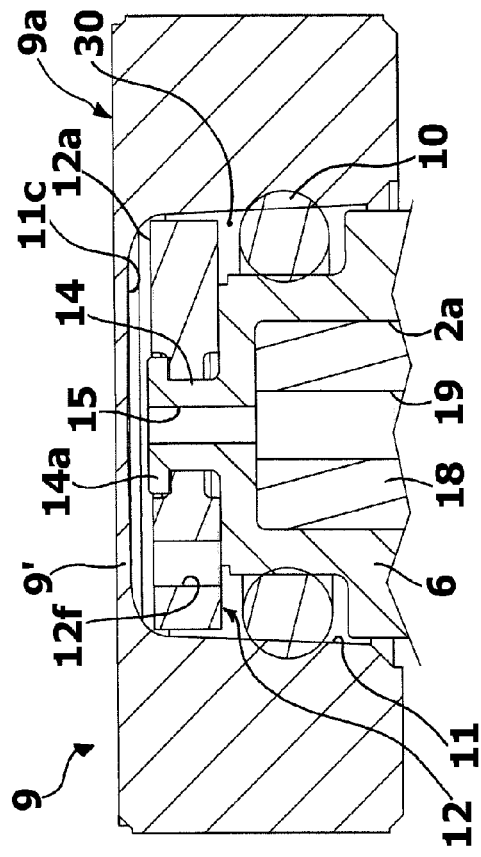
FIG. 6 is an enlarged detail of a part of FIG. 3.
Figure 7:
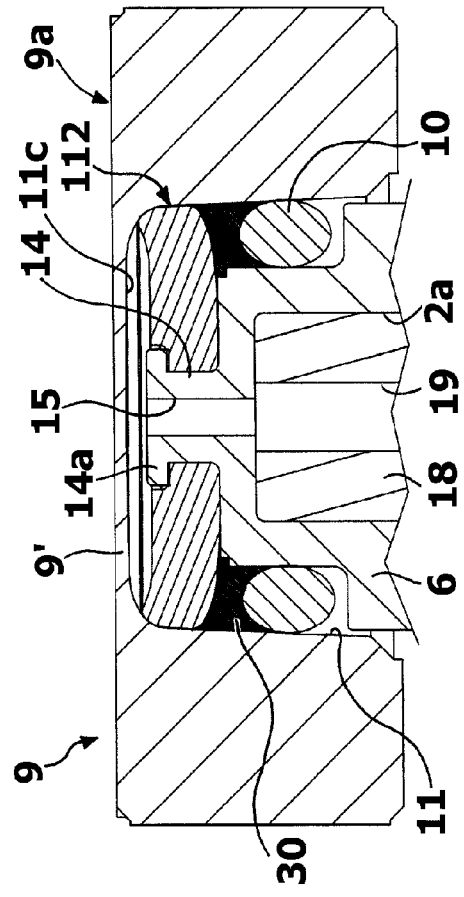
FIG. 7 is a sectional view similar to that of FIG. 6, but regarding a pressure sensor device according to the art known from WO 2008/078184.
Figure 8:
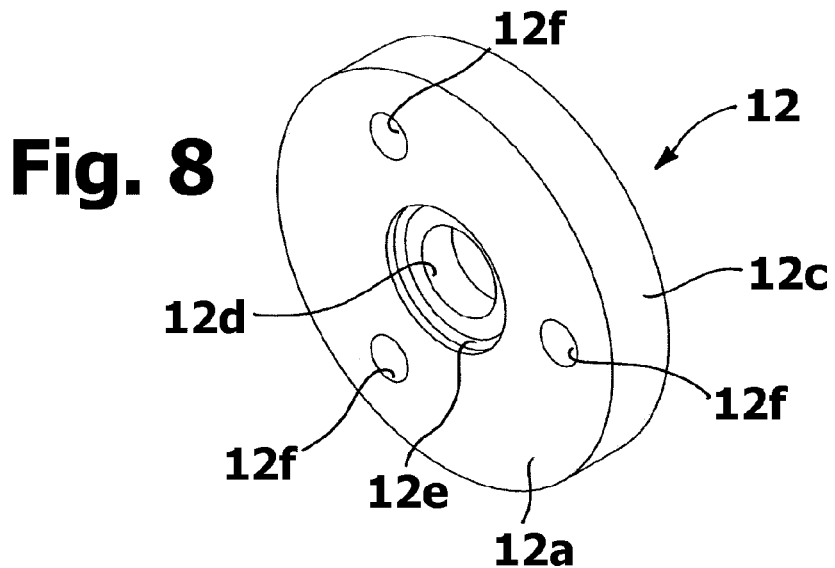
FIG. 8 is a perspective view of a compensation element of the device of FIGS. 1-3.
Figure 9:
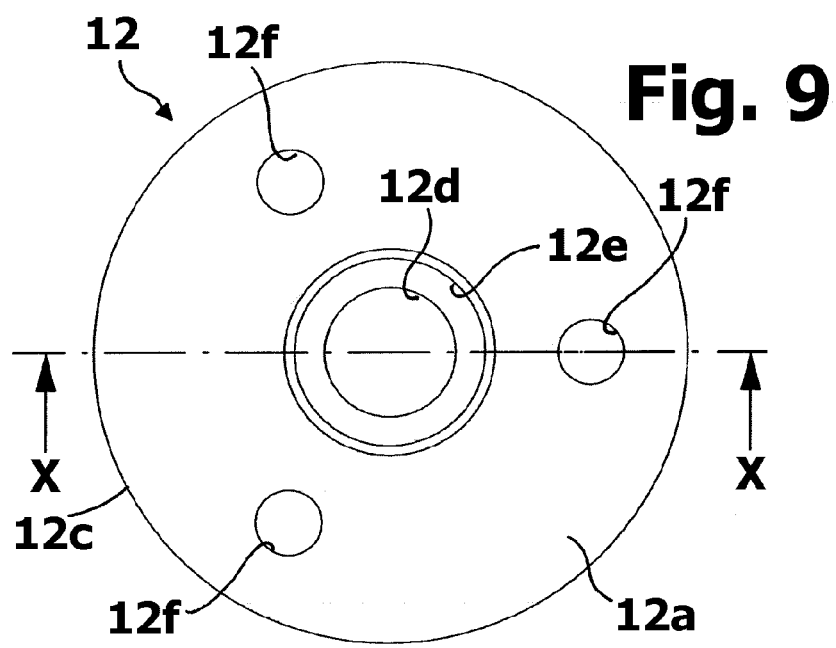
FIG. 9 is a plan view of the compensation element of FIG. 8, in enlarged scale.
Figure 10:
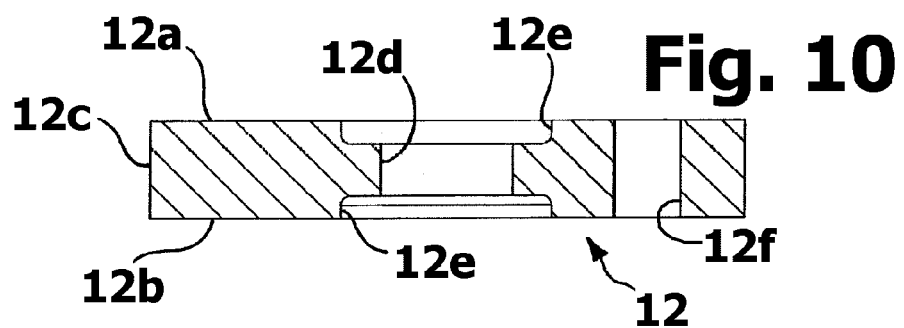
FIG. 10 is a section according to line X-X of FIG. 9.

As observable particularly in FIGS. 8-10, the compressible or compensation element 12 is generally cylindrical-shaped, substantially circular plate-shaped, with an upper face 12a, a lower face 12b and a peripheral face 12c. The element 12 has a central through hole 12d, fitted into which is an end appendage 14 of the tubular portion 6, as observable in FIGS. 3 and 7. Also the appendage 14 is tubular, i.e. it is passed through by a respective part 15 of the axial passage 2a of the body 2, intended to supply the fluid to the cavity 11 of the sensor body 9a. The upper end of the appendage 14, indicated with 14a only in FIG. 6, is substantially flange-shaped or it is provided with retaining elements, so as to maintain the compensation element 12 in the operating position. Preferably, at both of its ends, the hole 12d of the element 12 is shaped to define a seat 12e (see in particular FIG. 10), suitable to receive and cooperate with the flange part 14; the provision of a seat 12e at each end of the hole 12d, i.e. a symmetry of the compensation element 12, simplifies the manufacturing of the device 1, not requiring a predetermined direction for mounting the element 12 onto the appendage 14. It should be observed that the appendage 14 could be absent, with the element 12 fixed in another manner to the tubular portion 6, for example glued, welded or over-moulded.

As observable in FIG. 6, the upper face 12a of the element 12 faces the surface 11a of the membrane 9' at a given distance therefrom, indicatively comprised between 0 and 5 mm, in particular between 0 and 0.5 mm. Preferably, even the peripheral or circumferential face (12c, FIG. 8-10) of the element 12 faces the peripheral surface (11b, FIG. 5) of the sensor body 9a, at a slight distance therefrom: the distance between such surfaces is indicatively comprised between 0 and 2 mm, in particular between 0 and 0.5 mm. Preferably, the diameter of the element 12 is comprised between 8 and 10 mm.

As observable, particularly from FIG. 6, the element 12 is positioned in such a manner to substantially divide the cavity 11 of the sensor body 9a into an upper region and a lower region; the upper region, which is indicatively comprised between the face 12a of the element 12 and the membrane 9,' has a comparatively smaller usable volume with respect to the lower region, closed at the lower part by a gasket 10.

In the exemplified embodiment, the device 1 comprises a second compensation element, generally made and operating in a manner similar to that of the element 12. Such second compensation element, indicated with 18 in FIG. 3, is accommodated in a part of the passage 2a of the body 2 that extends between the portions 4-6. The element 18 has an inner cavity 19 axially aligned to the cavity 15 of the appendage 14, in such a manner to define a respective part of the duct that delivers the fluid subjected to measurement to the cavity 11 of the sensor body 9a; preferably, the cavity 19 has a larger passage section with respect to the axial cavity 15 of the appendage 14.

As observable in FIGS. 1-3, the body of the part 3 of the casing of the device 1 has a hollow lower region, delimited by a bottom wall 20 and a peripheral wall 21, whose end is configured to be coupled between the walls 5a and 5b of the body 2a of the part 2. Rising from the bottom wall 20 is a tubular body part 22, extended inside which are terminals 23 for the electrical connection of the device 1. In the non-limiting example, the terminals 23 are mounted in such a manner that the respective lower end faces inwards the cavity of the part 3, so as to be in contact with first contact elements, indicated with 24a in FIG. 3, of an electrical circuit indicated in its entirety with 24. The circuit 24 also comprises second contact elements (not shown), at which the terminals 9b (FIGS. 4 and 5) of the pressure sensor 9 are fitted and/or welded.

Still in FIG. 3, indicated with 25 is a member for supporting the circuit 24, which has pins, not shown, intended to rest in suitable perimeter seats (one of which is indicated with 9c in FIG. 5) of the sensor body 9a, in particular in order to obtain a polarisation or an accurate mutual coupling.

In the assembled configuration of the device 1, as partially observable for example in FIG. 6, the cavity 11 of the body 9a of the pressure sensor 9 is occupied by the end portion 6, provided for at whose top is the compensation element 12, which preferably occupies a substantial portion of the cavity itself. The element 12 is maintained in position by means of the appendage 14, and specifically by its flange portion 14a. As mentioned, such appendage also defines the end section 15 of the fluid supply duct, also comprising the section 19 defined in the second compensation element 18. The presence of the gasket 10 delimits, in the cavity 11, a chamber 30, alongside the exposed surfaces of the portion 6, whose chamber is in fluid communication with the fluid supplying duct 15, 19. As explained previously, the cavity 11, and thus the chamber 30, are substantially divided by the element 12 into two opposite regions.

As a non limiting example, let us assume that the sensor device 1 is intended to be used in combination with the so-called "SCR" (Selective Catalytic Reduction) systems, i.e. for controlling emissions of nitrogen oxides ($NO_x$), particularly for internal combustion engine vehicles (a system of this type, in which the invention finds advantageous application, is known by the name DeNox®). As known, the operation of such systems requires the use of reagents such as ammonia in aqueous solution or urea, whose injection pressure must be accurately controlled, by means of a sensor device.

Under normal operating conditions of the device 1 the fluid penetrates or moves into the cavity 19 of the element 18 and may in such manner occupy also the cavity 15 of the appendage 14, and thus reach the chamber 30 (FIG. 6); the pressure of the fluid thus presses membrane portion 9' of the sensor body 9a. Preferably, under normal operating conditions of the fluidic system, the pressure of the fluid is not sufficient to cause significant compression of the compensation elements 12 and 18, thus allowing at least a further compression for the compensation in case the fluid freezes.

The flexure of the membrane portion 9' due to the pressure of the fluid causes a corresponding deformation of the detection element R of FIG. 4, and thus of its resistive or piezoresistive characteristics. In this manner, a signal representing a pressure value of the fluid is generated to the terminals 9b of the element 9. Such signal, amplified and/or processed in a per se known manner by suitable electronic components of the circuit 24, reaches the terminals 23, which are electrically coupled to a wiring—not represented—connected to a suitable control unit, for example an electronic control unit of a vehicle or a system for controlling emissions of nitrogen oxides.

In particular circumstances part of the fluid subjected to measurement may be accumulated in the chamber 30 and inside the fluid duct through the body 2; under low ambient temperature such accumulated fluid may freeze, and thus increase in terms of volume. The fact that the cavity 11 of the sensor 9 is mainly occupied by the abovementioned components leads to the usable volume in which the fluid may be accumulated being small. Furthermore, the fact that such cavity 11 is practically contained whole in the body of the compensation element 12 allows reducing the risks of stress on the membrane portion 9' to the minimum, precisely due to the fact that the space—i.e. the chamber 30—in which the fluid may accumulate in proximity to the membrane portion 9', is considerably delimited by surfaces of the compensation element 12, which may be compressed by the thrust of the fluid which, freezing, increases in volume.

As observable, the general configuration of the device 1 according to the invention is very similar to that described in WO 2008/078184, except for the specific obtainment of the compensation element 12, which shall be described hereinafter.

The solution according to the art known from WO 2008/078184 allows sufficiently safeguarding the operating integrity of the sensor device. However, the applicant observed that the positioning of a compensation element in the cavity of the sensor body may be a source of occasional measurement inaccuracies (offsets), which might be difficult to notice during the normal use of the device. For example, in some cases the Applicant detected measurement errors due to a pressurised liquid remaining trapped between the compensation element and the pressure sensor. The concept is exemplified in FIG. 7; FIG. 7 is similar to FIG. 6 described previously, but it refers to a sensor device provided with a compensation element of the type illustrated and described in WO 2008/078184. The same reference numbers of FIG. 6 are used in FIG. 7 to indicate elements technically equivalent to those described previously, with the compensation element according to WO 2008/078184 being indicated with 112.

According to experiments performed by the Applicant it was shown that malfunctions of the known sensor device are due to the fact that the compensation element 112 tends to "stick" peripherally, in a deformed condition, to the sensor body, during certain emptying or depression cycles of the system on which the device is mounted. Regarding this, it should pointed out for example that in some SCR systems, after injecting urea the system is emptied, rapidly passing from a pressurised liquid condition (for example at about 9 bars) to a depression condition (for example about −0.5 bars).

When emptying the system or circuit, also due to the depression that is created during the emptying, there occurs a deformation of the element 112 such that it ends up adhering against surfaces defining the cavity 11, including the face 11c of the membrane 9', such that the element 112 actually causes a sealing between part of the chamber 30 and the passage 15: in such manner, a part of the pressurised fluid is restrained or trapped in the zone comprised between the element 112 and the gasket 10, represented black in FIG. 7, determining a direct thrust of the element 112 against the membrane 9'.

The consequence of this stagnation of pressurised fluid is that, at the subsequent cycle of filling of the fluidic cycle and measuring, an irregular pressure value is shown, i.e. an irregular residual pressure value (offset), which alters the actual measured pressure value (indicatively, such offset is about 0.6-0.7 bars, which is summed up to the actual pressure value).

It should be observed that the irregular deformation and/or stagnation of pressurised fluid may also be temporary, i.e. occur without the compensation element 112 sticking or remains stuck against the body 9a of the sensor 9. Even such temporary irregular condition may however be source of permanent irregular detections, particularly when using a control system or logic which automatic calibration. In some applications, for example, after emptying the system, the control system performs a new pressure detection, so as to use the detected value as the subsequent zero pressure reference; the value obtained through such new detection with the system empty is memorised in the control system, as zero pressure reference, for the subsequent detections and processing. In case of stagnation of pressurised fluid, for the reasons explained above, the reference value obtained from the abovementioned new detection is thus erroneously considered to represent a zero pressure. In other words, it is clear that, in case of an irregular residual pressure inside the sensor device, the reset of the reference value is distorted, with an ensuing error, called offset, in the subsequent measurements.

Based on the identification of this technical problem not observed previously, the invention is designed to provide the sensor device with connection means, for maintaining in fluid communication, and thus equilibrate in pressure, different parts of the cavity 11 such as for example—with reference to the illustrated example—the parts located above and beneath the compensation element, regardless of the pressure conditions present in the cavity itself and the possible deformation of the element 12 caused by the abovementioned depression condition.

In the currently preferred embodiment of the invention, these means are obtained through a particular configuration of the compensation element 12, which is provided with holes or passages which constantly maintain the upper and lower regions of the cavity 11 of the sensor body 9a in communication. The presence of at least one hole or passage in the compensation element 12 eliminates the previously outlined drawback, in that such holes or passages allow releasing the residual pressure when the hydraulic circuit is emptied, thus preventing the pressurised fluid from being trapped, in particular in the zone of the cavity 11 comprised between the element 12 and the radial gasket 10.

In the embodiment exemplified in FIGS. 8-10, the element 12 is provided with at least one, and preferably at least two through holes 12f additional with respect to the central hole 12d, which pass through the body of the element between its upper 12a and lower 12b faces. In FIGS. 8-10 the holes 12f are three, substantially equally spaced at 120° from each other, but such arrangement shall obviously be intended strictly for exemplification purposes.

Figure 11:
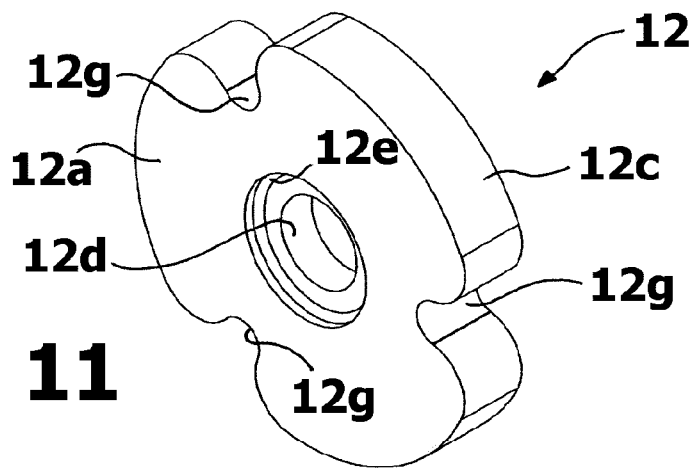
FIG. 11 is a perspective view of a compensation element according to a variant of the invention.
Figure 12:
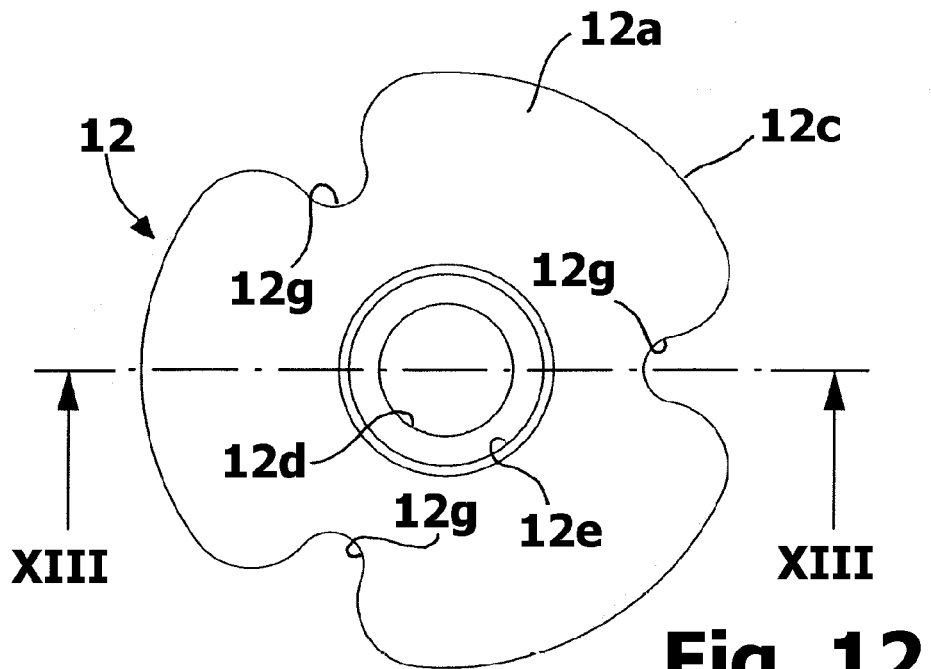
FIG. 12 is a plan view of the compensation element of FIG. 11, in enlarged scale.
Figure 13:
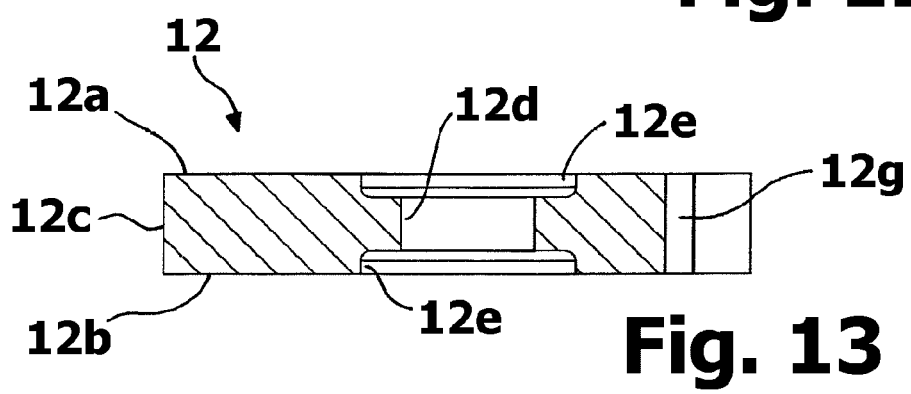
FIG. 13 is a section according to line XIII-XIII of FIG. 12.

FIGS. 11-13 regard a variant embodiment of a compensation element 12; the same reference numbers of FIGS. 8-10, are used in these figures to indicate elements technically equivalent to the ones used previously.

Provided for in this case are axial grooves or radial recesses 12g of the body of the element 12, at its peripheral face 12c; in particular, provided for are ducts or passages located in a perimeter zone of the element 12.

In this manner, in the assembled condition of the element 12, between its peripheral face 12c—at the abovementioned grooves or recesses 12g—and the cylindrical wall (11b, FIG. 5) of the cavity 11 there are gaps or passages that maintain the upper and lower region of the cavity 11 constantly in communication, and thus allow the passage of the fluid from the lower region to the upper region even when emptying the system. In the example of FIGS. 11-13 the compensation element 12 has a generally lobed configuration, and specifically three-lobed, but clearly even in this case the illustrated shape shall obviously be considered strictly for exemplification purposes, for example possibly being of another type suitable for the purpose, for example shaped to form a prism, star or triangle or square or pentagon, etcetera.

Practical tests performed by the Applicant allowed ascertaining that the pressure sensor devices provided with compensation elements 12 of the type described with reference to FIGS. 8-10 and 11-13 allow preventing risks related to occasional inaccuracies of the devices of the prior art, thus improving the detection reliability and accuracy under all conditions of use. Obviously, such elements 12 allow obtaining the same advantages described in WO 2008/078184, regarding the compensation of possible volume increase of the fluid subject of the pressure measurement.

It is clear that the device described by the way of an example may be subjected to numerous variants by a man skilled in the art without departing from the scope of the invention as described in the claims that follow.

In a possible variant not shown, passages in form of grooves or recesses having a function similar to that of the passages 12g could be obtained on the inner peripheral surface of the compensation element, i.e. in the surface that delimits the hole 12d, 12e.

The means used for connecting or equilibrating different regions of the chamber 11 of the sensor body 9 in pressure, such as the abovementioned lower and upper regions, may be obtained at least partially in the same sensor body. According to such variant, for example, formed in an upper zone of the cylindrical wall 11b (FIG. 5) of the sensor body 9a are one or more axial grooves, substantially intended to serve the functions of the grooves or recesses 12g of the element 12 of FIGS. 11-13. These grooves are extended at least partially into a zone of the wall 11b which faces the peripheral face of the compensation element. In another possible variant, the abovementioned means for connecting or equilibrating different regions of the chamber 11 in pressure, such as the abovementioned lower and upper regions, may be obtained at least partially in the body of the part 2 of the casing of the device 1. According to such variant, for example, axial grooves may be obtained in the zone of the tubular portion 6, 14 in which the element 12 is mounted. These grooves are extended at least partially into a zone of the portion 6, 14 which faces the peripheral face of the central hole 12d of the compensation element 12.

In the two abovementioned variants, the compensation element positioned in the cavity 11 of the sensor body 6a may also be of the known type described in WO 2008/078184, and not necessarily as in FIG. 8-10 or 11-13 described above, i.e. substantially plate-shaped, with one central hole and cylindrical peripheral face.

In alternative embodiments of the device, a compensation element may be accommodated in the cavity 11 slightly above one or more passages of the type indicated with 15; for such embodiment, the compensation element shall be provided with passages intended to be preferably axially aligned to the passage/s 15.

The invention claimed is:

1. A pressure-sensor device that comprises:
a pressure sensor (9) having a sensor body (9a), in particular of a monolithic type, in which a cavity (11) is defined having a bottom surface (11a) and a peripheral surface (11b), said bottom surface (11a) belonging to a membrane portion (9') of said sensor body (9a), a detection element (R), being operatively associated to said membrane portion (9');
a connection structure (2, 3) having a duct (2a, 15, 19) in communication with said cavity (11), designed to receive a fluid, a pressure of which is to be detected, said structure (2, 3) comprising:
a supporting body (2) of the pressure sensor (9), defining at least one respective passage (2a); and
a compressible element (12) that is designed to be in contact with said fluid and is configured for compensating possible variations of volume thereof; said compressible element (12) being positioned at least in part within said cavity (11),
wherein the device comprises connection means (12f; 12g) for setting in fluid communication, or for equilibrating in pressure, different regions of said cavity (11), characterized in that the connection means (12f; 12g) are formed at least in part
in said compressible element (12), or
in said sensor body (9a), or
in said supporting body (2).

2. The device according to claim 1, wherein the connection means (12f; 12g) comprise at least one connection passage (12f; 12g) formed in said compressible element (12).

3. The device according to claim 2, wherein the compressible element (12) has a body with an upper face (12a), a lower face (12b) and at least one peripheral face (12c), and wherein the said at least one connection passage (12f; 12g) is configured as at least one of
a through-hole (12f) of the body of the compressible element (12), extending between the upper and the lower faces (12a, 12b) thereof,
a groove or recess (12g) of the body of the compressible element (12), formed at an outer peripheral face (12c) thereof,
a groove or recess of the body of the compressible element (12), formed at an inner peripheral face o hole (12d) thereof.

4. The device according to claim 3, wherein the compressible element (12) has a central hole (12d) for mounting on a tubular portion (14) of the supporting body (2) which includes an end section (15) of said duct (2a, 15, 19), and wherein the said at least one connection passage (12f; 12g) is in an eccentric position relative to said central hole (12d).

5. The device according to claim 1, wherein the connection means comprise at least one groove or recess formed at least in part:
in an area of said peripheral surface (11b) of the cavity (11) facing an outer peripheral surface of the compressible element (12), and/or in a tubular portion (6, 14) of the supporting body (2) protruding within said cavity (11), and onto which the compressible element (12) is preferably mounted.

6. The device according to claim 1, wherein the compressible element (12) has a substantially lobed shape.

7. The device according to claim 1, wherein the compressible element (12) has a substantially flat cylindrical shape.

8. The device according to claim 1, also comprising at least one further compressible element (18).

9. The device according to claim 1, wherein the said compressible element (12) is positioned such that it substantially defines in the cavity (11) at least two opposite regions.

* * * * *